United States Patent
Frenger et al.

(10) Patent No.: US 11,916,625 B2
(45) Date of Patent: *Feb. 27, 2024

(54) ANTENNA ARRANGEMENT FOR DISTRIBUTED MASSIVE MIMO

(71) Applicant: Telefonaktiebolaget LM Ericsson (publ), Stockholm (SE)

(72) Inventors: Pål Frenger, Linköping (SE); Jan Hederen, Linghem (SE); Martin Hessler, Linköping (SE); Giovanni Interdonato, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/736,550

(22) Filed: May 4, 2022

(65) Prior Publication Data
US 2022/0263549 A1 Aug. 18, 2022

Related U.S. Application Data

(63) Continuation of application No. 16/435,054, filed on Jun. 7, 2019, now Pat. No. 11,349,530, which is a (Continued)

(30) Foreign Application Priority Data
Dec. 9, 2016 (EP) .................... 16203149

(51) Int. Cl.
*H04K 1/10* (2006.01)
*H04L 27/28* (2006.01)
(Continued)

(52) U.S. Cl.
CPC ........... *H04B 7/0452* (2013.01); *H01Q 1/246* (2013.01); *H01Q 1/007* (2013.01); *H04B 7/0426* (2013.01); *H04W 88/085* (2013.01)

(58) Field of Classification Search
CPC .. H04B 7/0452; H04B 7/0426; H04B 7/0413; H04B 17/24; H01Q 1/246; H01Q 1/007; H04W 88/085
(Continued)

(56) References Cited

U.S. PATENT DOCUMENTS

| 4,812,855 A | 3/1989 | Coe et al. |
| 6,054,960 A | 4/2000 | Tolson et al. |

(Continued)

FOREIGN PATENT DOCUMENTS

| CN | 101449190 A | 6/2009 |
| CN | 102685673 A | 9/2012 |

(Continued)

OTHER PUBLICATIONS

3GPP, "3rd Generation Partnership Project; Technical Specification Group Radio Access Network; NR; Base Station (BS) radio transmission and reception (Release 17)", 3GPP TS 38.104 V17.0.0, Dec. 2020, 1-295 pages.
(Continued)

*Primary Examiner* — Phuong Phu
(74) *Attorney, Agent, or Firm* — Murphy, Bilak & Homiller, PLLC

(57) ABSTRACT

An antenna arrangement comprises a body which in turn comprises a plurality of antenna devices, the antenna arrangement being characterized in that the body has a flexible structure and an elongated shape.

16 Claims, 14 Drawing Sheets

Related U.S. Application Data continuation of application No. PCT/EP2017/051669, filed on Jan. 26, 2017.

(51) Int. Cl.
*H04B 7/0452* (2017.01)
*H01Q 1/24* (2006.01)
*H01Q 1/00* (2006.01)
*H04B 7/0426* (2017.01)
*H04W 88/08* (2009.01)

(58) Field of Classification Search
USPC ........ 375/260, 219, 220, 222, 257, 295, 316
See application file for complete search history.

(56) References Cited

U.S. PATENT DOCUMENTS

| | | | |
|---|---|---|---|
| 6,975,877 | B1 | 12/2005 | Dergun et al. |
| 7,372,424 | B2 | 5/2008 | Mohuchy et al. |
| 8,203,483 | B2 | 6/2012 | Richards |
| 8,344,949 | B2 | 1/2013 | Moshfeghi |
| 9,806,818 | B2 | 10/2017 | Henry et al. |
| 9,960,849 | B1 | 5/2018 | Dogiamis et al. |
| 10,051,587 | B2 | 8/2018 | Jayaraman et al. |
| 10,079,668 | B2 | 9/2018 | Dogiamis et al. |
| 10,231,130 | B2 | 3/2019 | Sunay et al. |
| 11,349,530 | B2 * | 5/2022 | Frenger .................. H01Q 1/246 |
| 2001/0045915 | A1 | 11/2001 | Moren |
| 2006/0017607 | A1 | 1/2006 | Hayata et al. |
| 2006/0209670 | A1 | 9/2006 | Gorokhov et al. |
| 2007/0081557 | A1 | 4/2007 | Binetti et al. |
| 2007/0269170 | A1 | 11/2007 | Easton et al. |
| 2008/0204330 | A1 | 8/2008 | Hsiao et al. |
| 2008/0318614 | A1 | 12/2008 | Iizuka et al. |
| 2009/0122782 | A1 | 5/2009 | Horn et al. |
| 2009/0147768 | A1 | 6/2009 | Ji et al. |
| 2010/0067515 | A1 | 3/2010 | Chin et al. |
| 2010/0067588 | A1 | 3/2010 | Takano |
| 2010/0238917 | A1 | 9/2010 | Silverman et al. |
| 2011/0200325 | A1* | 8/2011 | Kobyakov ........... H04B 7/0413 398/118 |
| 2011/0216660 | A1 | 9/2011 | Lee et al. |
| 2011/0280287 | A1 | 11/2011 | Cheng et al. |
| 2012/0027361 | A1 | 2/2012 | Brower et al. |
| 2012/0120874 | A1 | 5/2012 | Mclaughlin et al. |
| 2012/0315938 | A1 | 12/2012 | Van et al. |
| 2013/0272696 | A1* | 10/2013 | Palanisamy ......... H04W 88/085 398/116 |
| 2013/0285879 | A1 | 10/2013 | Wheeler |
| 2014/0029689 | A1 | 1/2014 | Liu et al. |
| 2014/0037294 | A1 | 2/2014 | Cox et al. |
| 2014/0132477 | A1 | 5/2014 | Chan et al. |
| 2014/0211779 | A1 | 7/2014 | Caire et al. |
| 2014/0362840 | A1 | 12/2014 | Wong et al. |
| 2015/0003261 | A1 | 1/2015 | Silverman et al. |
| 2015/0162751 | A1 | 6/2015 | Leabman et al. |
| 2015/0372744 | A1 | 12/2015 | Lehtinen |
| 2016/0112263 | A1 | 4/2016 | Henry et al. |
| 2016/0277160 | A1 | 9/2016 | Lim et al. |
| 2016/0323925 | A1 | 11/2016 | Alanen et al. |
| 2016/0360533 | A1 | 12/2016 | Bennett et al. |
| 2017/0195109 | A1 | 7/2017 | Perez-Cruz et al. |
| 2017/0195140 | A1 | 7/2017 | Yi et al. |
| 2017/0264011 | A1 | 9/2017 | Kim et al. |
| 2017/0271745 | A1 | 9/2017 | Yun et al. |
| 2017/0279515 | A1 | 9/2017 | Wu et al. |
| 2017/0295550 | A1 | 10/2017 | Amizur et al. |
| 2018/0041980 | A1 | 2/2018 | Virginas et al. |
| 2018/0109392 | A1 | 4/2018 | Gerszberg et al. |
| 2018/0152226 | A1 | 5/2018 | Li et al. |
| 2019/0229821 | A1* | 7/2019 | Liu ....................... H04B 17/24 |
| 2019/0260459 | A1 | 8/2019 | Jeon et al. |
| 2019/0261202 | A1 | 8/2019 | Tang et al. |
| 2019/0361180 | A1 | 11/2019 | Lam et al. |
| 2019/0363763 | A1 | 11/2019 | Frenger et al. |

FOREIGN PATENT DOCUMENTS

| | | | |
|---|---|---|---|
| CN | 102754365 | A | 10/2012 |
| CN | 103222108 | A | 7/2013 |
| CN | 108418614 | A | 8/2018 |
| EP | 0667068 | A1 | 8/1995 |
| EP | 0830754 | A1 | 3/1998 |
| EP | 2214261 | A1 | 8/2010 |
| EP | 2169769 | B1 | 1/2011 |
| EP | 2515374 | A2 | 10/2012 |
| EP | 2629363 | A1 | 8/2013 |
| EP | 2999155 | A1 | 3/2016 |
| GB | 1321582 | A | 6/1973 |
| JP | 2004503991 | A | 2/2004 |
| JP | 2008182733 | A | 8/2008 |
| JP | 2009527145 | A | 7/2009 |
| JP | 2009537964 | A | 10/2009 |
| JP | 2014017678 | A | 1/2014 |
| KR | 20190098693 | A | 8/2019 |
| WO | 9506365 | A1 | 3/1995 |
| WO | 9641430 | A1 | 12/1996 |
| WO | 0007307 | A2 | 2/2000 |
| WO | 0197465 | A1 | 12/2001 |
| WO | 2007142805 | A2 | 12/2007 |
| WO | 2010086173 | A1 | 8/2010 |
| WO | 2016039842 | A1 | 3/2016 |
| WO | 2016115546 | A1 | 7/2016 |
| WO | 2018103897 | A1 | 6/2018 |
| WO | 2019101290 | A1 | 5/2019 |
| WO | 2019152793 | A1 | 8/2019 |
| WO | 2018103897 | A9 | 10/2019 |
| WO | 2019240808 | A1 | 12/2019 |

OTHER PUBLICATIONS

3GPP, "3rd Generation Partnership Project; Technical Specification Group Radio Access Network; NR; Study on Integrated Access and Backhaul; (Release 16)", 3GPP TR 38.874 V.16.0.0, Dec. 2018, 1-111 pages.

Dahlman, Erik, et al., "5G NR The Next Generation Wireless Access Technology", Academic Press, Elsevier Ltd., 2018, 1-469 pages.

Interdonato, Giovanni, "Signal Processing Aspects of Cell-Free Massive MIMO", Linköping Studies in Science and Technology Licentiate Thesis No. 1817, 2018, 1-49 pages.

Interdonato, Giovanni, et al., "Ubiquitous Cell-Free Massive MIMO Communications", arXiv:1804.03421v4 [cs.IT], Sep. 6, 2019, 1-13 pages.

Narevsky, Nathan, et al., "eWallpaper Burst-Mode Serial Link", BWRC Summer Retreat, May 18-20, 2014, 1 page.

Preuss, Robert D., et al., "Two-Way Synchronization for Coordinated Multicell Retrodirective Downlink Beamforming", IEEE Transactions on Signal Processing, vol. 59, No. 11, Nov. 2011, pp. 1-13.

Puglielli, Antonio, et al., "Design of Energy- and Cost-Efficient Massive MIMO Arrays", Proceedings of the IEEE, vol. 104, No. 3, Mar. 2016, pp. 1-21.

Zhang, Yuxian, et al., "Measurement and Evaluations of Coherent Joint Transmission for 5G Networks", 2017 IEEE Vehicular Technology Conference (VTC Spring), Jun. 4, 2017, pp. 1-5.

* cited by examiner

ANTENNA ARRANGEMENT FOR DISTRIBUTED MASSIVE MIMO

TECHNICAL FIELD

The present invention relates generally to the field of wireless communication. More particularly, it relates to an improved antenna arrangement for use in massive MIMO (multiple-input and multiple-output) systems, more particularly distributed massive MIMO systems (D-maMIMO or distributed maMIMO).

BACKGROUND

Massive MIMO is one example of Multi-user MIMO (MU-MIMO) which is a set of multiple-input and multiple-output technologies for wireless communication, in which a set of users or wireless terminals, each with one or more antennas, communicate with each other. In contrast, single-user MIMO considers a single multi-antenna transmitter communicating with a single multi-antenna receiver. In a similar way that OFDMA adds multiple access (multi-user) capabilities to OFDM, MU-MIMO adds multiple access (multi-user) capabilities to MIMO. MU-MIMO has been investigated since the beginning of research into multi-antenna communication, including work by Telatar on the capacity of the MU-MIMO uplink. Multiple-antenna (MIMO) technology is becoming mature for wireless communications and has been incorporated into wireless broadband standards like LTE and Wi-Fi. Basically, the more antennas the transmitter/receiver is equipped with, the more the possible signal paths and the better the performance in terms of data rate and link reliability. The price to pay is increased complexity of the hardware (number of RF amplifier frontends) and the complexity and energy consumption of the signal processing at both ends.

Massive MIMO (also known as large-scale antenna systems and very large MIMO) is thus, as stated above, a multi-user MIMO technology where each base station (BS) is equipped with a large number of antenna elements (at least 50), which are being used to serve many terminals that share the same time and frequency band and are separated in the spatial domain. A key assumption is that there are many more BS antennas than terminals; at least twice as many, but ideally as many as possible. Massive MIMO offers many benefits over conventional multi-user MIMO. First, conventional multi-user MIMO is not a scalable technology, since it has been designed to support systems with roughly equal numbers of service antennas and terminals, and practical implementations typically relies on frequency-division duplex (FDD) operation. By contrast, in massive MIMO, the large excess of service antennas over active terminals TDD operation brings large improvements in throughput and radiated energy efficiency. These benefits result from the strong spatial multiplexing achieved by appropriately shaping the signals sent out and received by the base station antennas. By applying precoding to all antennas the base station can ensure constructive interference among signals at the locations of the intended terminals, and destructive almost everywhere else. Furthermore, as the number of antennas increases, the energy can be focused with extreme precision into small regions in space. Other benefits of massive MIMO include use of simple low-power components since it relies on simple signal processing techniques, reduced latency, and robustness against intentional jamming.

By operating in TDD mode, massive MIMO exploits the channel reciprocity property, according to which the channel responses are the same in both uplink and downlink. Channel reciprocity allows the BS s to acquire channel state information (CSI) from pilot sequences transmitted by the terminals in the uplink, and this CSI is then useful for both the uplink and the downlink. By virtue of the law of large numbers, the effective scalar channel gain seen by each terminal is close to a deterministic constant. This is called channel hardening. Thanks to the channel hardening, the terminals can reliably decode the downlink data using only long-term statistical CSI, making most of the physical layer control signaling redundant, i.e. low-cost CSI acquisition. This renders the conventional resource allocation concepts unnecessary and results in a simplification of the MAC layer. These benefits explain why massive MIMO has a central position in preliminary 5G discussions.

However, massive MIMO system performances are affected by some limiting factors: Channel reciprocity requires hardware calibration. In addition, the so called pilot contamination effect is a basic phenomenon which profoundly limits the performance of massive MIMO systems. Theoretically, every terminal in a massive MIMO system could be assigned an orthogonal uplink pilot sequence. However, the maximum number of orthogonal pilot sequences that can exist is upper-bounded by the size of the coherence interval, which is the product of the coherence time and coherence bandwidth. Hence, adopting orthogonal pilots leads to inefficient resource allocation as the number of the terminals increases or it is not physically possible to perform when the coherence interval is too short. As a consequence, pilots must be reused across cells, or even within the home cell (for higher cell density). This inevitably causes interference among terminals which share the same pilot. Pilot contamination does not vanish as the number of BS antennas grows large, and so it is the one impairment that remains asymptotically.

To implement massive MIMO in wireless networks, two different architectures can be adopted:

Centralized (C-maMIMO) 101, where all the antennas 110 are co-located in a compact area at both the BS 120 and user sides, UEs 115, as shown in FIG. 1. It represents the conventional massive MIMO system.

Distributed (D-maMIMO) 102, where BS antennas, herein named as access points (APs) 135, are geographically spread out over a large area, in a well-planned or random fashion, as shown in FIG. 2. Antennas 135 are connected together and to a central processing unit (CPU) 130 through high-capacity backhaul links 140 (e.g. fiber-optic cables). It is also known as cell-free massive MIMO system.

The inventors believe that D-maMIMO architecture is one important enabler of network MIMO in future standards. Network MIMO is a terminology that is used for a cell-free wireless network, where all the BSs that are deployed over the coverage area act as a single BS with distributed antennas. This can be considered the ideal network infrastructure from a performance perspective, since the network has great abilities to spatially multiplex users and exactly control the interference that is caused to everyone.

The distinction between D-maMIMO and conventional distributed MIMO is the number of antennas involved in coherently serving a given user. In D-maMIMO, every antenna serves every user. Compared to C-maMIMO, D-maMIMO has the potential to improve both the network coverage and the energy efficiency, due to increased macro-diversity gain. This comes at the price of higher backhaul requirements and the need for distributed signal processing. In D-maMIMO, the information regarding payload data, and power control coefficients, is exchanged via the backhaul network between the APs and the CPU. There is no exchange of instantaneous CSI among the APs or the central unit, that is CSI acquisition can be performed locally at each AP.

Due to network topology, D-maMIMO suffers from different degrees of path losses caused by different access distances to different distributed antennas, and very different shadowing phenomena that are not necessarily better (antennas deployed at the street level are more easily blocked by buildings than antennas deployed at elevated locations). Moreover, since the location of antennas in D-maMIMO has a significant effect on the system performance, optimization of the antenna locations is crucial. In addition, D-maMIMO potentially system suffers a low degree of channel hardening. As mentioned earlier, the channel hardening property is key in massive MIMO to suppress small-scale fading, and derives from the huge number of antennas involved in a coherent transmission. In D-maMIMO, APs are distributed over a wide area, and many APs are very far from a given user. Therefore, each user is effectively served by a smaller number of APs. As a result, channel hardening might be less pronounced. This would considerably affect the system performance.

The performance of any wireless network is clearly the availability of good enough CSI to facilitate phase-coherent processing at multiple antennas. Intuitively, acquiring high quality CSI should be easier with a C-maMIMO than in a D-maMIMO where the antennas are distributed over a large geographical area. Nevertheless, the macro-diversity gain has a dominant importance and leads to improved coverage and energy efficiency.

A problem with a massive MIMO deployment is that a large number of antennas generate a large amount of data. This implies that with traditional radio to antenna interfaces very large capacity fiber network are needed to shuffle this data around. Fiber is both expensive and needs skilled personal for installation. Both of which limit the deployment scenarios for massive MIMO. There is also a scalability issue as different size base-band units are needed to handle different array sizes, e.g. one to handle 32 antennas one other for 128 antennas etc.

From a practical point of view, C-maMIMO solution where all antenna elements (i.e., APs) are placed close together has a number of drawbacks compared to D-maMIMO solution where the antenna elements are distributed over a larger area. These are e.g.

Very large service variations: UEs that happen to be located close to the central massive MIMO node will experience very good service quality while for UEs further away the service quality will degrade rapidly.

Sensitive to blocking: On high frequency bands in particular the signal is easily blocked by obstacles that obscures the line-of-sight between the UE and the C-maMIMO node. In D-maMIMO a number of antenna elements may be blocked but it requires much larger obstacles to block all antenna elements High heat concentration: Due to heat concentration it is difficult to make C-maMIMO nodes very small. In D-ma MIMO each antenna element (and its associated processing) generates only a small amount of heat and this simplifies miniaturization.

Large and visible installations: C-maMIMO installations can become large, especially on lower frequency bands.

D-maMIMO installations are actually even larger, but the visual impact can be made almost negligible.

Installation requires personnel with "radio skills": Installing a complex piece of hardware in a single location requires planning and most probably also proper installation by certified personnel. In a D-maMIMO installation it is less crucial that each and every one of the very many antenna elements are installed in a very good location. It is sufficient that the majority of the elements are installed in good enough locations. The requirements on installation can be significantly relaxed with a D-maMIMO deployment.

Power limited by regulations (e.g. specific absorption rate SAR): If the antenna elements are located close together there will be an area close to the installation where electromagnetic wave safety rules applies. This is likely to put limits on the total radiated radio frequency power in many installations. In a D-maMIMO installation a user may come close to a small number of antenna elements but it is impossible to be physically close to many elements that are distributed over a large area.

There are many significant benefits with D-maMIMO compared to C-maMIMO. But the cabling and internal communication between antenna elements in a D-maMIMO is prohibiting in state-of-the art solutions. It is not economically feasible to connect a separate cable between each antenna element and a central processing unit (e.g. in a star topology) in a D-maMIMO installation. Both a arbitrary and a optimal AP topology on their own may lead to a prohibitive cost for the backhaul component, as well as installation cost for distributing processing and settings.

There is thus a need to provide a distributed maMIMO system that is easy and cheaper to install.

There is also a need for an improved processing and internal communication between individual antenna elements and a central processing unit in any MIMO installation, i.e., regardless if it is centralized or distributed and regardless if the number of antenna elements in the MIMO installation is large or small.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of some embodiments to solve or mitigate at least some of the above or other disadvantages.

This is generally achieved by providing a base station (BS) base station characterized by that antenna elements and the associated antenna processing hardware are located inside the same cable that provides data transfer and power supply to said antenna elements and processing hardware.

According to a first aspect, this is achieved by an antenna arrangement for a base station to be used in a Distributed maMIMO system comprising a body comprising a plurality of antenna devices, the antenna arrangement being characterized in that the body having a flexible structure and an elongated shape.

In some embodiments, the antenna arrangement may further comprise a connector (700) for connecting the antenna arrangement to a central unit (610), acting as a base station.

In some embodiments, the antenna arrangement may further comprise a bus portion and a power supply line for transmitting data to and from the plurality of antenna devices and/or to/from the central unit.

In one embodiment the bus portion and the power supply line are the same connection.

In some embodiments each antenna device comprises a controller and an antenna element, wherein said controller is configured for performing per element processing, the antenna arrangement thus being arranged for distributed processing utilizing the controllers of the antenna devices.

In some embodiments, the antenna arrangement may further comprise or may be arranged to be connected to a connector for connecting the antenna arrangement to at least one other antenna arrangement.

In some embodiments, the antenna arrangement may further comprise or may be arranged to be connected to a power unit.

In some embodiments the antenna devices are arranged in one row.

In some embodiments a majority of the antenna devices, such as all, are arranged to face the same direction.

In some embodiments the antenna devices are arranged in a cover or sheath of said body. In some embodiments the body is a cable.

In some embodiments the body is an elongated strip.

In some embodiments the body is a film.

In some embodiments, additional devices such as additional sensors may be integrated in the antenna arrangement: for example. Temperature sensor, Pressure sensor, Light sensor, Proximity sensor, Vibration sensor, Microphones, Camera sensors, Malfunction detection or alarms, such as e.g. burglar alarm.

According to a second aspect there is provided distributed massive MIMO (Multiple Input Multiple Output System) comprising a central unit arranged to act as a base station and at least one antenna arrangement according to above.

An advantage of some embodiments is that a cost efficient building practice for distributed Ma-MIMO base stations is provided.

Embodiments of the present invention provide for simple and accurate positioning.

Embodiments of the present invention also remove the requirement of an advanced timing or angular estimation for positioning of terminals.

BRIEF DESCRIPTION OF THE DRAWINGS

Further objects, features and advantages will appear from the following detailed description of embodiments, with reference being made to the accompanying drawings, in which:

FIG. 13 shows a flowchart for performing the method of performing per-element processing according to an example embodiment of the present invention;

DETAILED DESCRIPTION

In the following, embodiments will be described where an antenna arrangement being flexible is used to provide a distributed maMIMO system 100.

Figure 1:
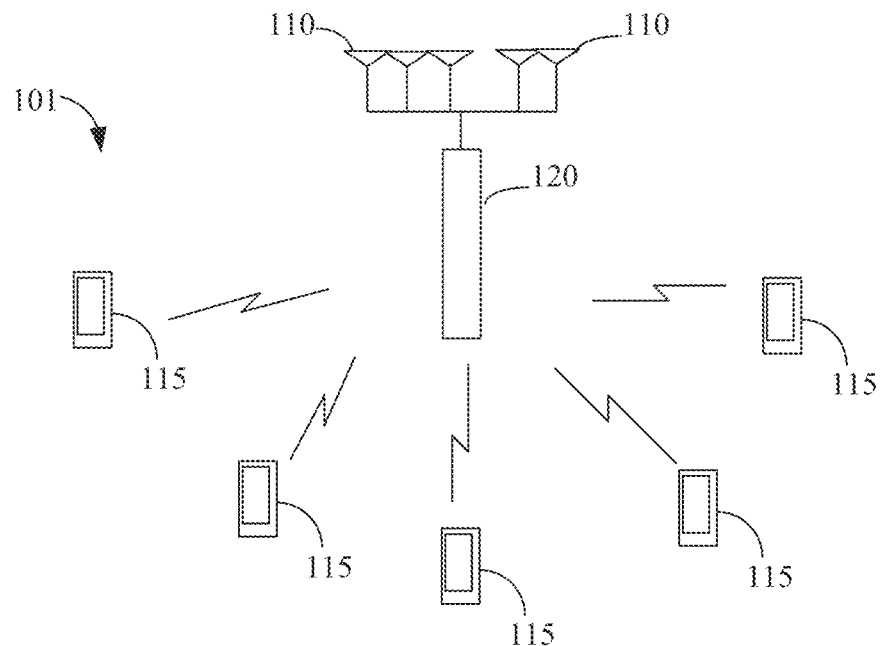
FIG. 1 is a schematic drawing illustrating an example prior art centralized maMIMO system.
Figure 2:
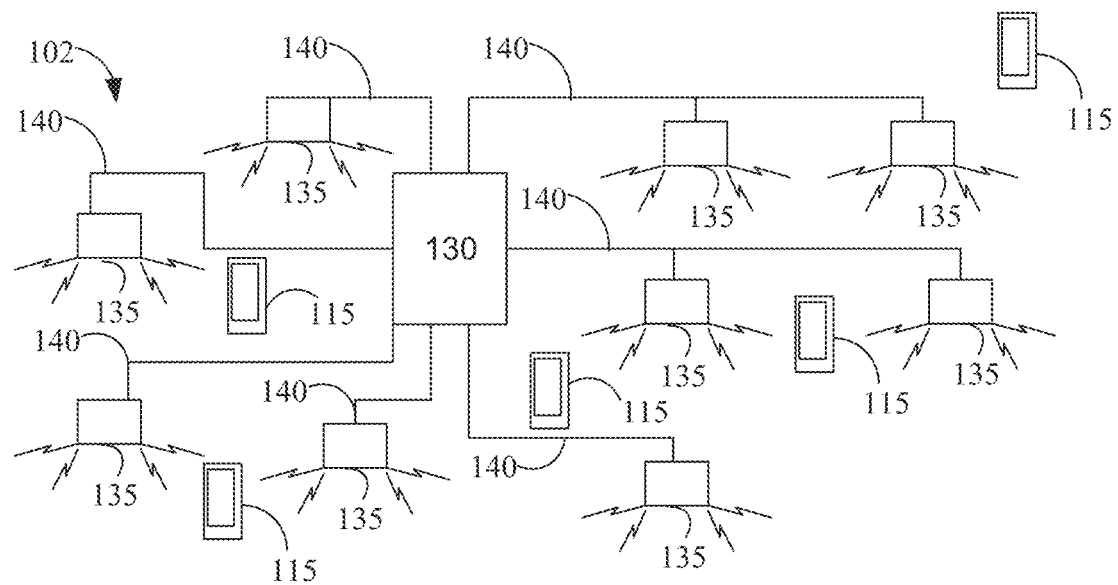
FIG. 2 is a schematic drawing illustrating an example prior art distributed maMIMO system.
Figure 3:
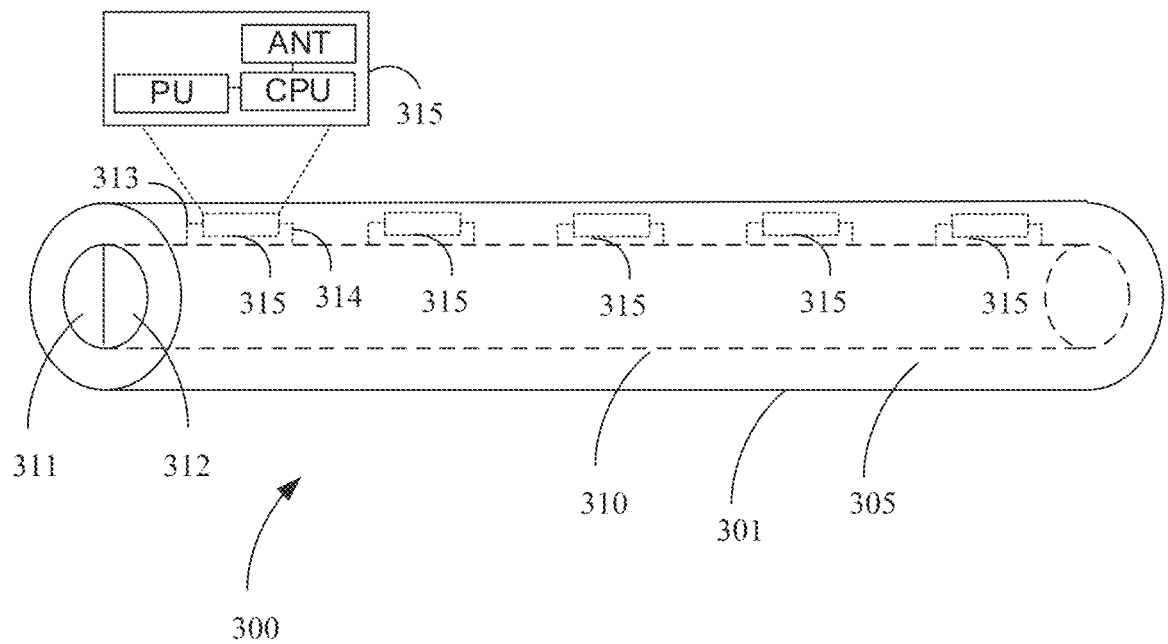
FIG. 3 is a schematic illustration of an antenna arrangement according to one embodiment of the present invention.

FIG. 3 is a schematic illustration of an antenna arrangement according to one embodiment of the present invention. The antenna arrangement 300 comprises a cable 301 having a sheath or cover 305 encompassing a centre core 310. As would be understood by a skilled person, the cover or sheath may comprise a jacket and/or an insulating shield, being a metallic shield or a dielectric insulator depending on the type of core. Such elements are not shown to maintain the schematic illustration uncluttered and easily understandable. Such elements are taken to be comprised in the cover.

As can be seen in the figure, the antenna arrangement 300 comprises a plurality of antenna devices 315. The number of antenna devices 315 in one antenna arrangement varies with the intended frequency and the length of the antenna arrangement 300, but one example is a 100 meter long cable 301 housing 400 antenna devices 315.

In one embodiment, the antenna devices 315 are encased in the cover 305. In one embodiment, the antenna devices 315 are housed in the cover 305. As a skilled person would understand, there exist several options of how to provide the antenna devices 315 in the cover 305 of the antenna arrangement 300, housing or encasing being but two options.

In one embodiment, the core 310 comprises a bus portion 311 for transmitting information and data. In one embodiment, the bus portion 311 comprises a metal-based cable 311 for transmitting information and data. No difference will be made between data and information for the purposes of this application and they will both be referred to as information or data interchangably. In one embodiment, the bus portion 311 comprises an optical fibre for transmitting information and data between the antenna devices 315 and a processing unit (not shown in FIG. 3).

The antenna device 315 comprises a data port 313 for transmitting information and data to/from other antenna devices 315 and/or the processing unit through the bus portion 311.

In one embodiment, the core 310 also comprises a power supply line 312 for providing the antenna devices 315 with power. The antenna device 315 comprises a coupling 314 for receiving power from the power supply line 312.

In one embodiment, each antenna device 315 requires 2 W of power for handling all processing and providing 0.1 W Radio Frequency output power. IN an antenna arrangement with 100 elements, this results in a radio output of 10 W for a total power consumption of 200 W.

As larger number of antenna devices are most likely needed, the overall needed power will grow and placing all antennas in close proximity to one another, as in prior art systems provides for problems when it comes to heat dissipation. But, by arranging all elements in stripes as per the present invention, the antenna devices are spread over a larger area and at a larger distance from one another, thus solving the problem of heat dissipation.

In one embodiment, where the bus portion 311 is capable of transmitting power, the bus portion 311 and the power supply line 312 may be one and the same element 311/312. In one such embodiment, the power coupling 314 and the data port 313 may be the same connection 313/314.

In one such embodiment, the data is transmitted along with the power by superimposing the information on the current.

As can be seen in FIG. 3, one antenna device is shown in an enlarged schematic view, showing some components of the antenna device 315. The antenna device 315 comprises a controller such as a processor or Central Processing Unit, CPU with accompanying memory (not explicitly shown, but taken to be comprised in the controller, even if different from the processor) for storing instructions and data.

The antenna device also comprises a Power Unit (PU) arranged to receive and distribute power as needed by the various components. The Power Unit (PU) may also act as the data port for receiving data being transmitted along with the power.

The antenna device 315 also comprise at least one antenna element ANT. The size of the antenna element depends on the frequency that the antenna is designed to operate at. The size of each antenna element is proportional to half of the wavelength ($\lambda/2$) and the dependency of wavelength versus carrier frequency (f) equals $\lambda = c/f$ where c is the speed of light. For example, a frequency of 60 GHz requires that the antenna element is at least 2.5 mm, 30 GHz requires that the antenna element is at least 5 mm; 15 GHz requires that the antenna element is at least 10 mm and 2 GHz requires that the antenna element is at least 75 mm.

As can be seen in FIG. 3, the antenna arrangement 300 is housed in a cable 301 having a round form. However, this is only an example embodiment, and several other options exist, as will be shown in FIGS. 4A and 4B.

Figure 4A:
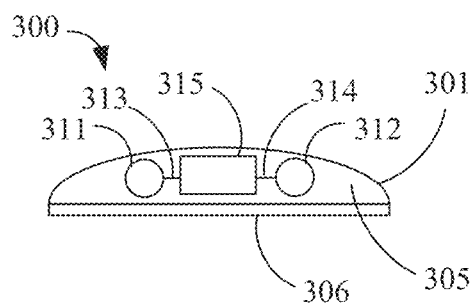
FIG. 4A shows a schematic side view of a variation of an antenna arrangement according to an embodiment of the present invention.

FIG. 4A shows a schematic side view of a variation of an antenna arrangement according to an embodiment of the present invention. As can be seen in FIG. 4A, the antenna arrangement comprises an elongated body 301 comprising a cover 305 housing a plurality of antenna devices 315 (only one seen) which are connected to a power supply line 312 through a coupling 314 and a bus portion 311 through a data port 313.

The elongated body 301 has a length that far exceeds the width at least by a factor of 50. In one embodiment the length exceeds the width by a factor 100. In one embodiment the length exceeds the width by a factor 500. In one embodiment the length exceeds the width by a factor 1000. The width thus, in some embodiments, practically being negligible compared to the length.

The height of the body 301 is considered to be in the same order as the width, or smaller than the width, in some embodiments practically being negligible compared to the length.

The antenna arrangement may comprise an adhesive layer 306 for simplifying the mounting of the antenna arrangement 300 to a structure such as a wall or ceiling or roof.

Figure 4B:
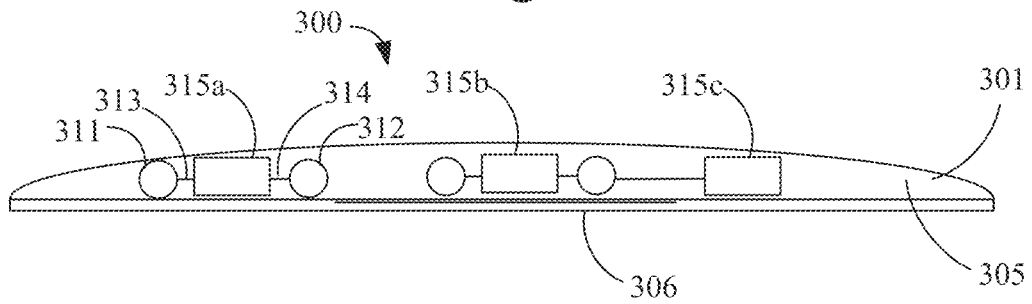
FIG. 4B shows a schematic side view of a variation of an antenna arrangement according to an embodiment of the present invention.

FIG. 4B shows a schematic side view of a variation of an antenna arrangement according to an embodiment of the present invention. As can be seen in FIG. 4B, the antenna arrangement comprises a wide elongated body 301, such as a film comprising a cover 305 housing a plurality of antenna devices 315a, 315b and 315c. In FIG. 4B only three antenna devices are shown, but it should be noted that as this is a side view, the shown antenna devices 315a-c represent rows of antenna devices. The antenna devices 315 in a row may be supplied by a designated (designated for that row) power supply line 312 and bus portion 311 as for antenna device 315a. The antenna devices 315 in a row may alternatively or additionally be supplied by a shared power supply line 312 and bus portion 311 as for antenna devices 315b and 31cb.

The antenna arrangement may comprise an adhesive layer 306 for simplifying the mounting of the antenna arrangement 300 to a structure such as a wall or ceiling or roof.

The exact shape of the antenna arrangement is not at the core of the present invention, but that the antenna arrangement has an elongated form is as this provides for a distributed placing of antenna device 315.

The antenna arrangement 300 is preferably flexible, at least in the manner that it is able to be rolled on a spool. In one embodiment the antenna arrangement 300 is flexible in the manner that it can be bent in at least one degree of freedom (such as up/down with reference to FIG. 4). In one embodiment the antenna arrangement 300 is flexible in the manner that it can be bent in at least two degrees of freedom (such as up/down and left/right with reference to FIG. 4).

This may be accomplished by constructing the cover 305 of the antenna arrangement 300 of a flexible material and by spacing the antenna device 315 sufficiently for allowing a degree of bending. The exact spacing required depends on the size of the antenna device 315 and the desired degree of flexibility, and also the shape of the sheath 305.

By providing an elongated and flexible antenna arrangement several benefits are achieved.

One benefit is that the antennas may be distributed in a more free manner by simply deploying the antenna arrangement 300. As the data bus and the power supply is included in the arrangement, there is no need for difficult installation procedures requiring knowledge in radio technology.

Another benefit is that the antenna arrangement becomes apparently smaller as it may be distributed in a more clever manner, such as by following contours of a building instead of being placed as a large panel on the top of the building.

Another benefit is that the antenna arrangement may be arranged or placed around corners of a building thereby avoiding many so called blocking issues that may arise in urban installations where buildings (even the one the antenna is placed on) may block the radio waves sent or received by the antenna(s). By providing a flexible antenna arrangement, the antenna arrangement may be draped around corners thereby receiving a free field of view for transmitting signals.

As the antenna arrangement may be placed in an irregular manner and over a larger area, the likelihood that all possible fields of view are covered increases dramatically, and the entire view around the antenna arrangement (or most of it) may be serviced by at least some antennas. This provides for a reduced requirement for precision installations, and again, the antenna arrangement is much easier to install.

The embodiments of FIGS. 3 and 4A show antenna arrangements where all antenna devices are connected in a row, for example in series, but parallel connections may also be used, as long as the antenna devices are arranged substantially in a row. The row does not need to be a straight line, but a general row will suffice for providing additional flexibility in all directions. Such embodiments are also easy to install as they are highly flexible to work with unlike broad and/or rigid arrangements, as in the prior art.

The embodiments of FIGS. 3, 4A and 4B show antenna arrangements where all antenna devices are arranged to face the same general direction. However, it is possible to arrange the antenna devices also facing different directions (to simplify installing as the installer does not need to place the antenna arrangement in any particular direction, the embodiment where all or most antenna elements face the same general direction (assuming the strip is placed in a straight line) carries the benefit that all antenna devices are put to use, it will be easy to install as the direction of the antenna devices can easily be marked and all antenna devices are facing the same direction thereby ensuring that one knows which area is covered. Should more or additional areas/angles want to be covered this is easily achieved by the antenna arrangement being arranged in a different shape, the antenna arrangement being flexible thus allowing this.

Figure 5A:
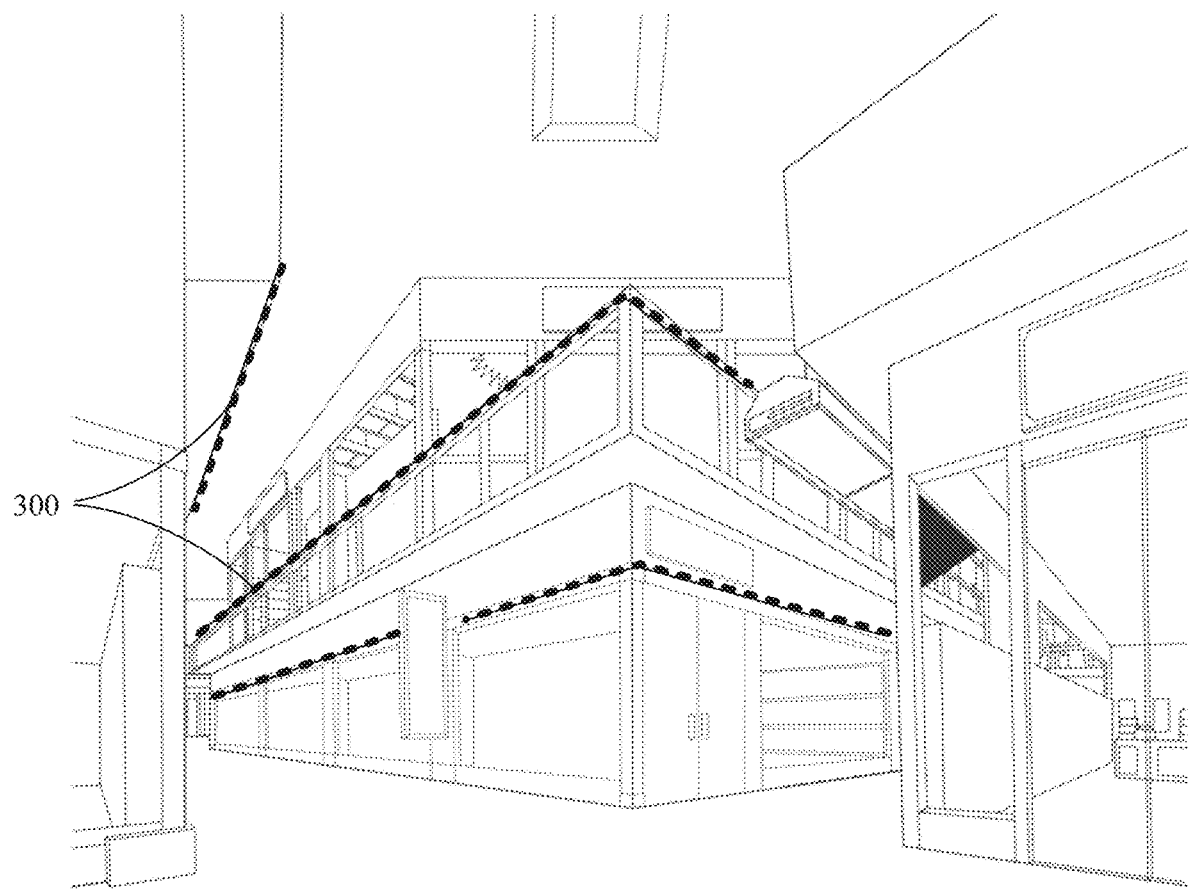
FIGS. 5A to 5C show various examples of placements of antenna arrangements.
Figure 5B:
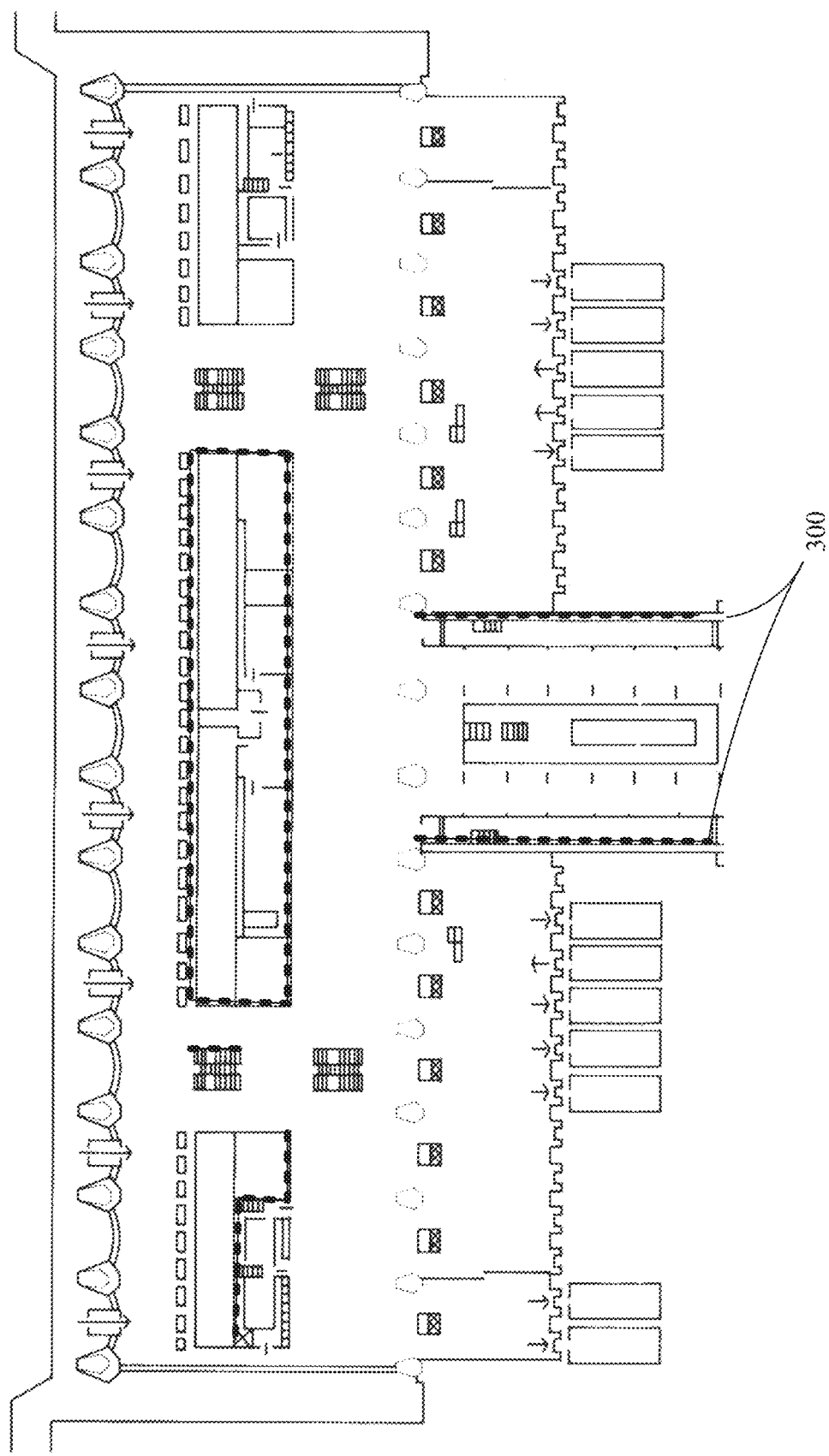
Figure 5C:
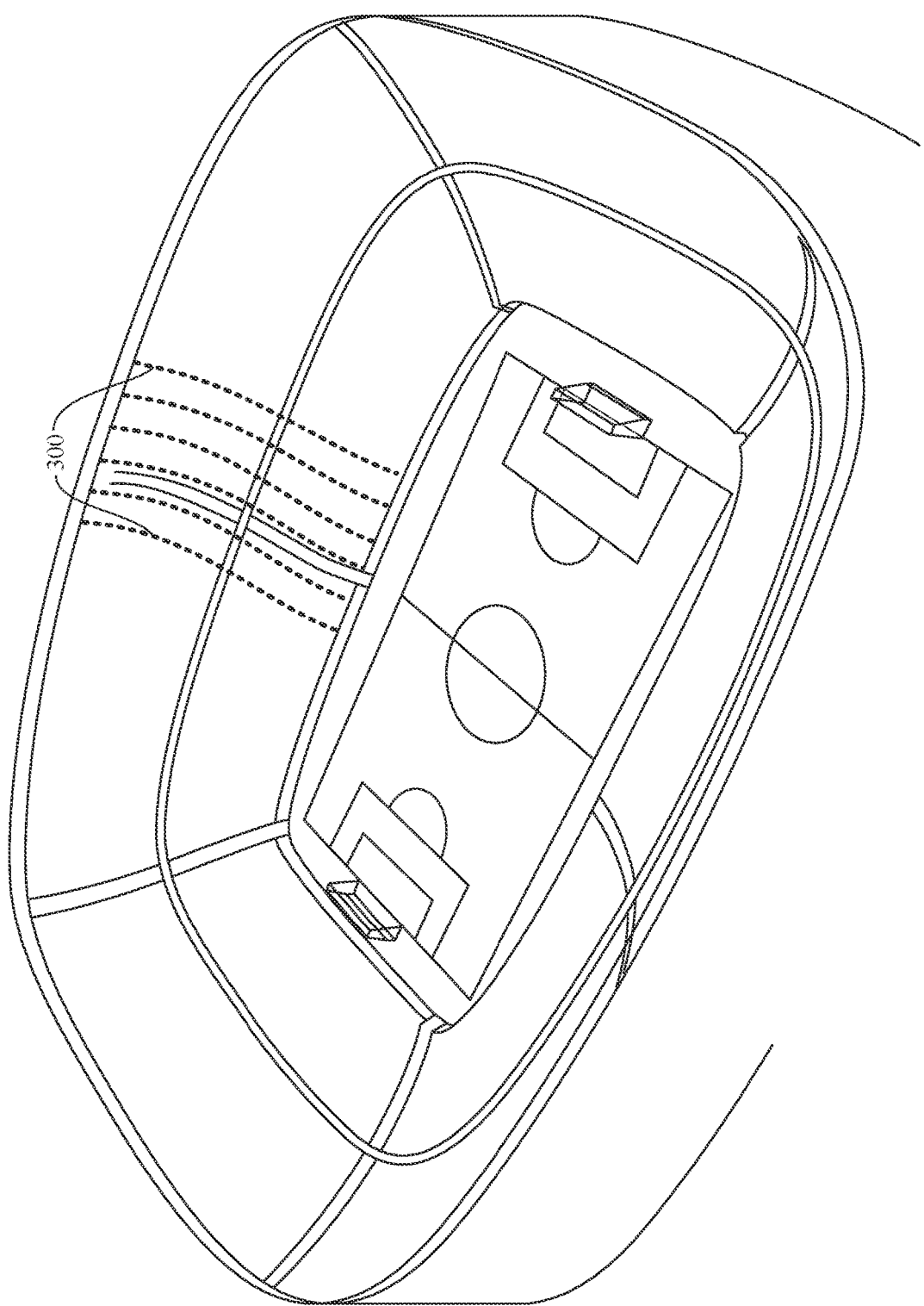

In one such embodiment, the antenna devices are arranged to be cross-polarized. For high frequencies, the antenna elements are smaller than the antenna arrangement (stripe) thickness and one may arrange two antenna elements as a cross inside the antenna arrangement (stripe) as opposed to if the element size is larger than the stripe thickness, when the elements must be placed along the stripe direction. Additionally, the flexibility also allows for a high precision installation as the antenna arrangement may be formed (to a degree) to fit the surroundings. FIGS. 5A to 5C show various examples of placements of antenna arrangements 300, the antenna arrangements 300 being indicated by dotted lines. In FIG. 5A an example of placing the antenna arrangements according to herein along structure lines of a shopping mall is shown. This will enable all customers, staff and also (stationary) equipment in the shopping mall to be serviced efficiently in all areas/corners of the shopping mall in manner where the actual antennas are hidden or at least not given a prominent position so that the visitors might not even notice the massive arrangement of antennas.

In FIG. 5B an example of placing the antenna arrangements according to herein along structure lines of an airport is shown. This will enable all travelers, staff and also (stationary) equipment in the airport to be serviced efficiently in all areas/corners of the airport in manner where the actual antennas are hidden or at least not given a prominent position so that the visitors might not even notice the massive arrangement of antennas. As this is in an airport assumingly receiving a lot of foreign user equipments, this also allows for placing additional antenna arrangements should such be needed to provide service for users having foreign or unusual telecommunication needs, such as operating under different frequencies. This would not be possible using large panels as the panels would simply take too much space, space which is needed for information or advertising purposes.

In FIG. 5C an example of placing the antenna arrangements according to herein along structure lines of a sports stadium is shown. This will enable all visitors and also stationary equipment in the sports stadium to be serviced efficiently in all areas/corners of the sports stadium in manner where the actual antennas are hidden or at least not given a prominent position so that the visitors might not even notice the massive arrangement of antennas. This also allows for placing a large number of antennas servicing an assumingly large number of visitors (over 40.000 visitors is not uncommon and some stadiums may even house over 100.000 visitors, with some examples having been known of over 200.000 visitors—Strahov Stadium) in one small area. This would not be possible using large panels as the large panels would require too much space, special mountings which may be too heavy for existing structures, and might even block the view of the sports field.

Figure 6:
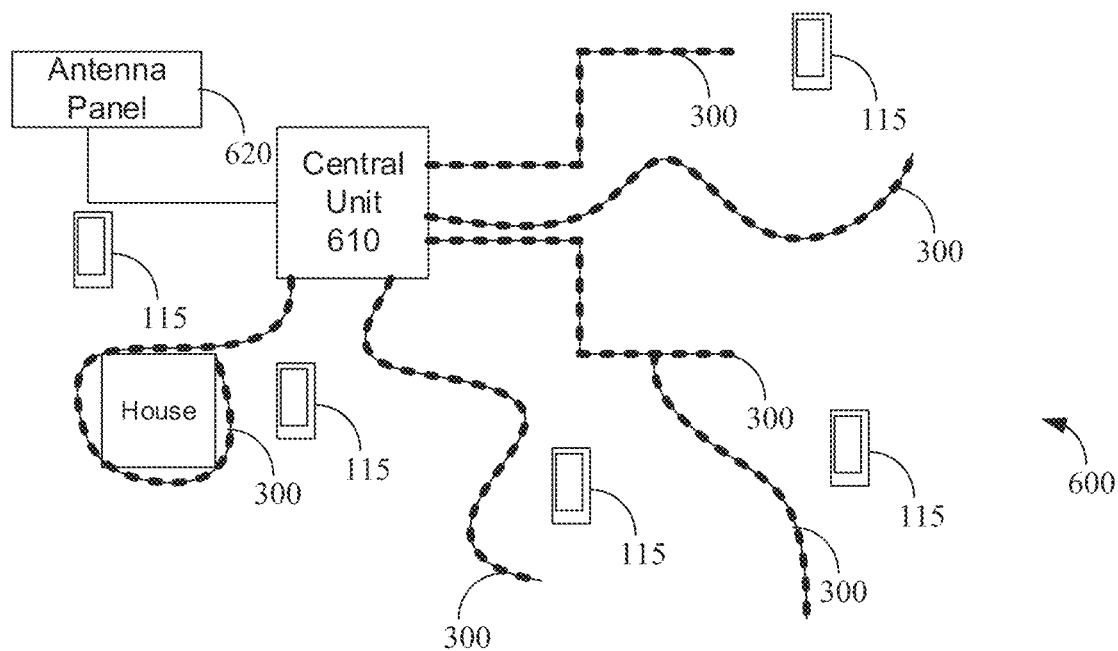
FIG. 6 shows an example of a system configured to utilize antenna arrangements according to embodiment of the present invention.

FIG. 6 shows an example of a system 600 configured to utilize antenna arrangements 300 according to embodiment(s) disclosed herein.

A central (processing) unit 610 is connected to a plurality of antenna arrangements 300 each comprising a plurality of antenna elements (not referenced but indicated by the dots). The central unit 610 or base station, is thus enabled to service a plurality of user equipments (UEs) 115.

As can be seen in FIG. 6, the antenna arrangements may be placed in straight lines to provide for a structured arrangement. The antenna arrangements may also or alternatively be placed in curved lines to provide for a flexible arrangement, such as around a house or other building or structure.

As can also be seen in FIG. 6, the central unit 610 may also be connected to an access point or antenna panel 620. The antenna arrangement according to herein is thus possible to combine with prior art antenna panels.

The antenna arrangement 300 naturally comprise a connector at one end for being connected to the central unit. However, the antenna arrangement may also comprise two connectors, one at each end for connecting to further antenna arrangements. This enables for placing the antenna arrangements in series. As can also be seen in FIG. 6, the antenna arrangement may also be spliced or connected in parallel through the connectors, possibly through a multiple way connector.

Figure 7:
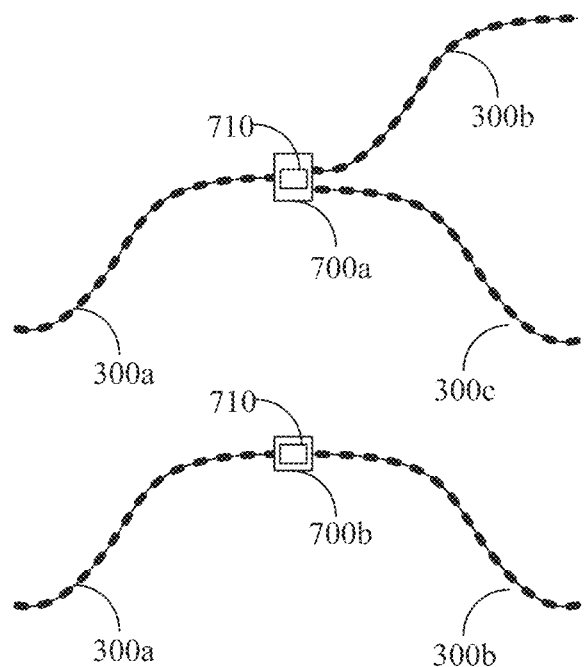
FIG. 7 shows a general concept of connecting several antenna arrangements in series and in parallel.

The exact structure of such connectors depend on the type of bus portion, power supply line and shape of the antenna arrangement, but as connectors are generally known, no specific details will be given as to the structure of the connector. However, FIG. 7 shows the general concept of connecting several antenna arrangements in series and in parallel. The upper portion of FIG. 7 shows a serial connection between a first antenna arrangement 300a, a second antenna arrangement 300b and a third antenna arrangement 300c through a connector 700a. The lower portion of FIG. 7 shows a serial connection between a first antenna arrangement 300a and a second antenna arrangement 300b through a connector 700b.

To provide enough power for all antenna elements 300, it may be necessary to include intermediate power units that are to be connected in series (or parallel) with the antenna arrangements 300. In one embodiment a connector 700 may comprise a power unit 710. The power unit 710 may be battery powered, arranged to be connected to a power outlet, or be solar powered.

This allows for many antenna arrangements to be connected, which in turn provides for each antenna arrangement to be of a small size, thereby being easier to transport and handle to and at an installation site.

Figure 8:
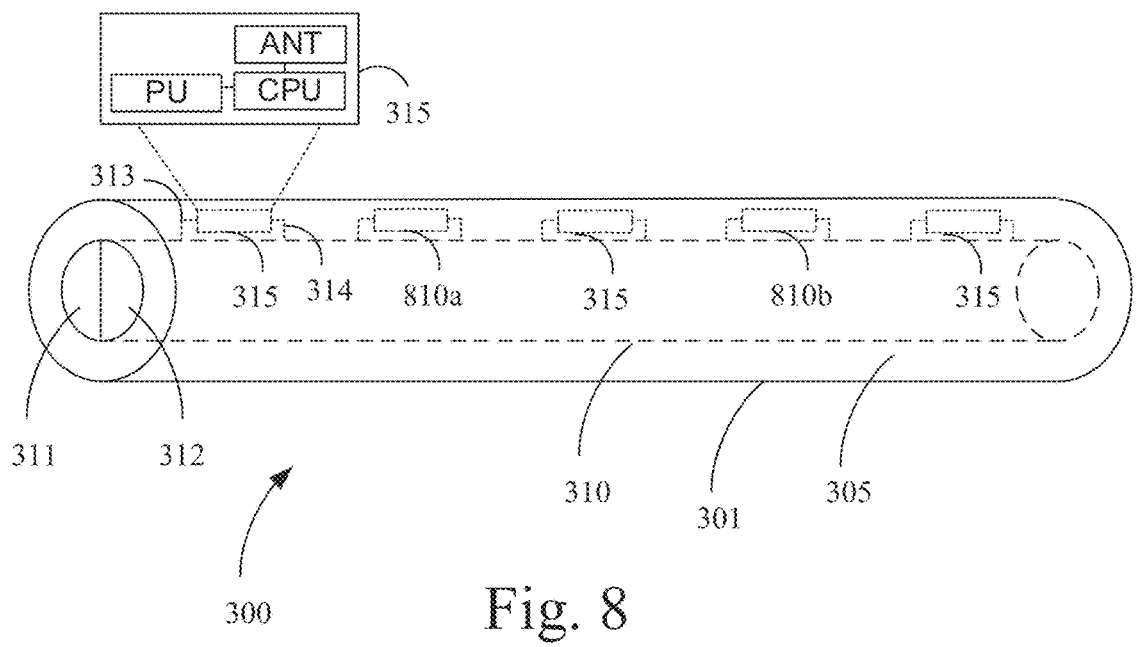
FIG. 8 shows a schematic view of an example embodiment of the present invention.

In one embodiment, as shown in FIG. 8 showing a schematic view of an example embodiment of the present invention, the antenna arrangement 300 is further arranged to comprise at least one additional device 810. In the example of FIG. 8, two such sensors 810a, 810b are shown as being interspersed between the antenna devices 315, but it should be noted that the number of additional devices 810 and their placement relative the antenna devices may vary from embodiment to embodiment.

The additional devices 810 may be alarms, error detection devices and/or sensors such as temperature sensors, microphones, pressure sensors, vibration sensors, optical sensors, such as ambient light sensors or cameras, to mention a few examples.

The sensors 810 may be connected to the power supply line 312 and the bus portion 311 as are the antenna devices 315. This provides for a wide array of sensors or other devices to be distributed over an area, wherein their power supply and the communication with the devices are already handled by the antenna arrangement 300.

Examples of how to use such additional devices may be to employ vibration sensors for collecting vibration information over a large area, which vibration information may be used for proactively detecting a beginning earth quake.

Temperature and light sensors may be used to provide accurate weather information, and also to control smart buildings in the area.

Light sensors may be used to control street lights and other lights in a neighborhood.

In one embodiment the additional devices 810 may comprise LEDs (Light Emitting Diodes) for possible ornamentation of a structure.

In the following the operation of antenna arrangements according to herein will be discussed.

Figures 9A, 9B:
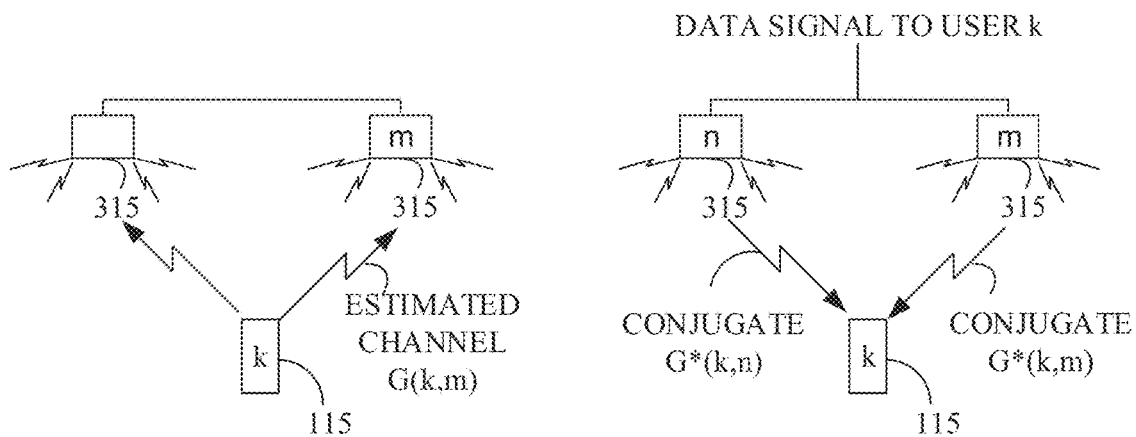
FIGS. 9A and 9B show a schematic view of a UE communicating with antenna devices according to an example embodiment of the present invention.
Figure 10:
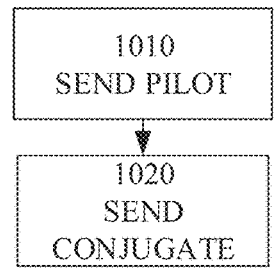
FIG. 10 shows a general method for executing the processing illustrated in FIGS. 9A and 9B, according to an example embodiment of the present invention.

An important realization that the inventor have made is that both the transmitter and receiver processing can be distributed under certain assumptions, such as that of FIGS. 9A and 9B showing a schematic view of a UE 115 communicating with antenna devices 315. A general method for executing the processing illustrated in FIGS. 9A and 9B is shown in FIG. 10, to which simultaneous reference is given. As seen in FIG. 9A a user equipment 115 sends 1010 a pilot transmission. In response thereto a data signal to user UE 115 is transmitted 1020 carrying the conjugate for the beam forming as seen in FIG. 9B, which enables the processing required to be performed per antenna device 315.

Figure 11:
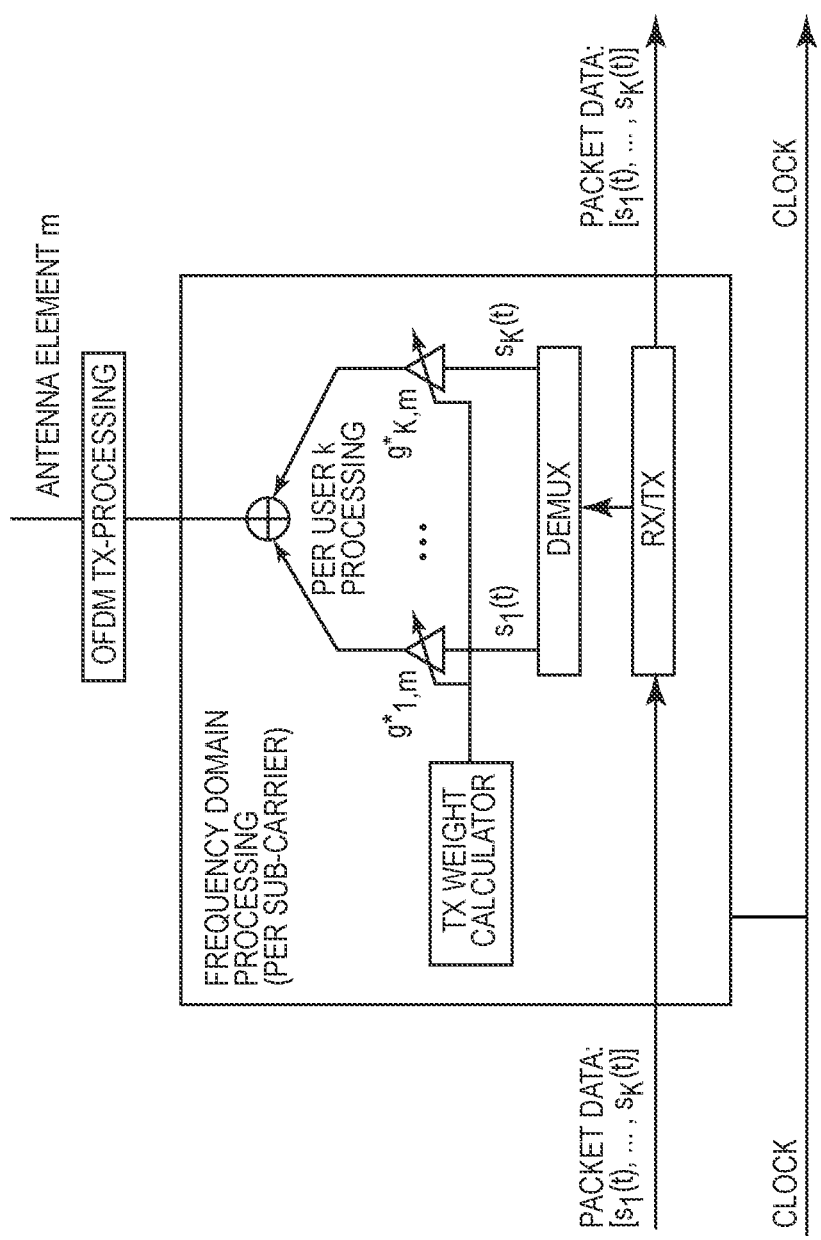
FIG. 11 shows a serialized transmission TX interface of Massive-MIMO transmission according to an example embodiment of the present invention.
Figure 12:
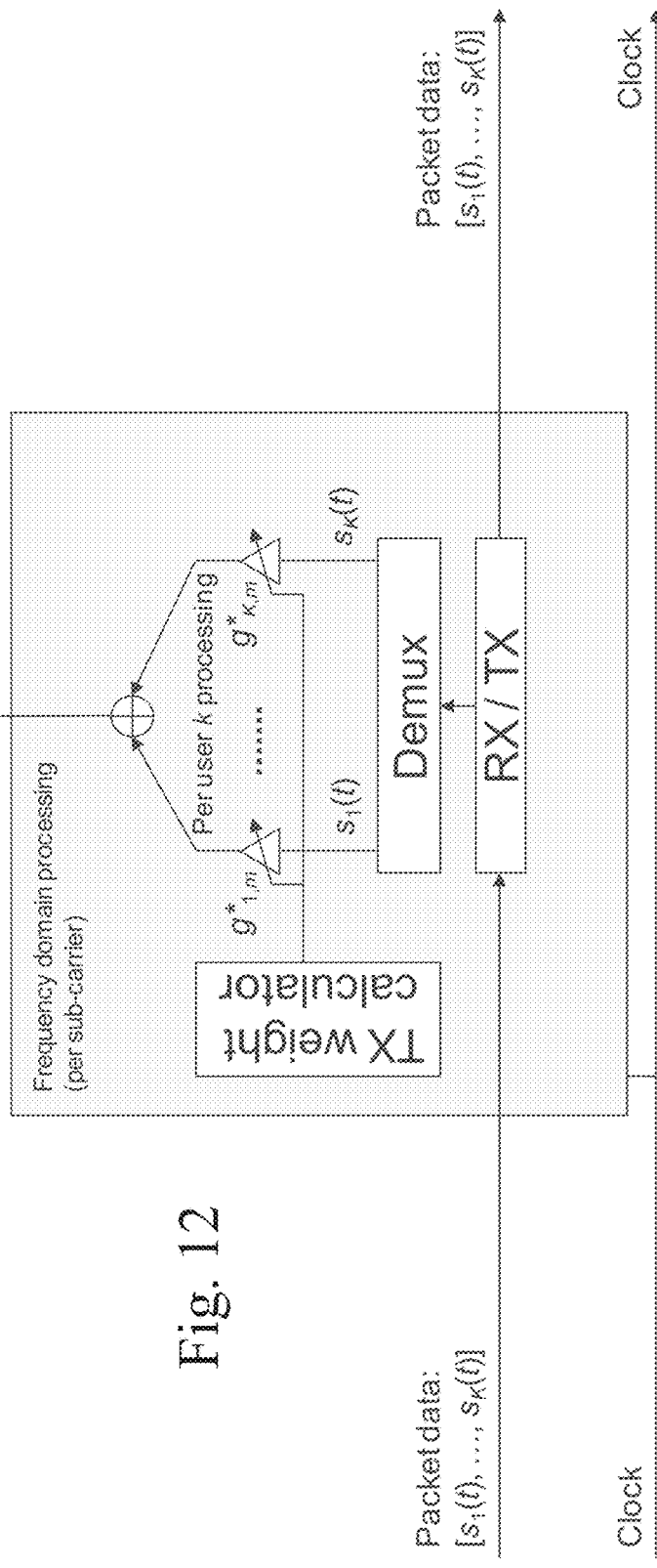
FIG. 12 shows a serialized reception RX interface for Massive-MIMO reception according to an example embodiment of the present invention.

The invention also teaches a method of performing per-antenna element processing in a multi-antenna transmitter (FIG. 11) and receiver (FIG. 12). FIG. 13 shows a flowchart for performing the method of performing per-element processing.

Referring to FIG. 11 showing a serialized transmission TX interface of Massive-MIMO transmission, where we note that the transmit weight calculations is performed in a first step 1310. This can be done by instructing each UE transmit one or more pilots that are used to determine the transmitter side channel state information (CSI-T) required for weight calculations. For example, the transmit weights may be selected as the conjugate of the channel estimation from the pilot transmissions. Transmit-weight calculations can be performed in many ways and they are not the primary focus of this invention. In some embodiments the transmit weight calculations are done "per element" (e.g. as the maximum ratio transmission, MRT, weight calculation discussed above).

On the transmitter side, see FIG. 12 showing a serialized reception RX interface for Massive-MIMO reception, the data to transmit is transmitted 1320 on a shared data bus. Each antenna element process unit receives 1330 up to K streams of data (either one data stream per user or one user with K data stream, or some other combination of users and data stream resulting in K data streams in total) from the shared data bus.

In each antenna element the data streams are scaled 1340 with the pre-calculated antenna weights and the sum-signal is transmitted over a radio channel to the receiver(s).

On the receiver side each antenna element processing unit receives 1350 the data corresponding to the different data streams on a shared data bus. The received antenna signal is multiplied with the reception weights corresponding to the different data streams (said reception weights are calculated in a previous training phase). The processed data streams are combined 1360 with the received data streams from the neighboring antenna element processor unit and the resulting data streams are encoded and transmitted 1370 on said data bus to the next antenna processing unit.

This invention relates to making single antenna modules (possible dual-polarized) or models with smaller number of antennas elements. We will denote the antennas on antenna unit m as antenna element m. Each such antenna unit implements channel estimation and suitable base-band processing, e.g. could for multiple antennas contain advances receivers such as IRC and possible advanced transmitters such a zero-forcing etc. One such radio unit contains an input from a previous radio unit and an output to a next radio unit.

The input contains incoming data from a previous antenna unit m−1, said incoming data contains combined signals from one or multiple previous antenna units 1, . . . , m−1 for one or more UEs. In reception the antenna unit use its SINR and channel estimate for each of said UEs to scale and phase rotate its antenna signal from antenna element m (possible from multiple antennas) and add said antenna signal to the incoming combined signals received for each of the UEs. This combined signal is then outputted to a next antenna unit m+1.

In transmission the radio unit receives the input data for one or multiple UEs, for each of said UEs the radio unit scales and phase rotates the input data according to a channel estimate that the antenna unit has performed previously and adds said signals together or form a transmission signal transmitted on antenna element m. The input data is forwarded to the next radio unit.

Observe that this creates a chain of such antenna units, the sequence is started by an input that is empty, and it is ended by outputting the total sum signal to a unit configured to decoded the sum signal, or otherwise continue the processing of the signal.

Figure 14:
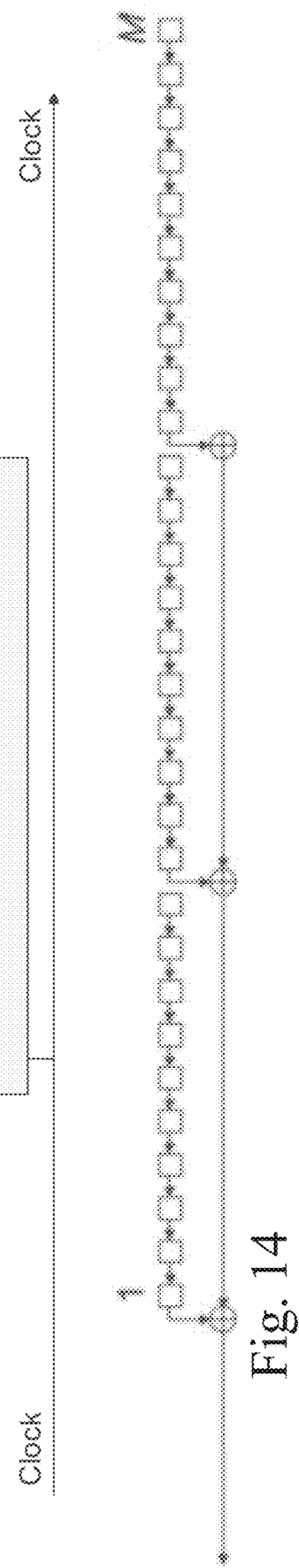
FIG. 14 shows an example of batch receiver processing according to an example embodiment of the present invention.

The reception as well as the transmitter processing may be performed in parallel. In the receiver processing the results for each data stream need to be added to the processing result from the previous antenna element in the chain. The combining step is a simple per-stream addition operation and can be performed in a few batch steps as depicted in FIG. 14 showing an example of batch receiver processing. Note that antenna elements in a batch processing implementation may be located in e.g. a two dimensional or a one-dimensional array.

In order to reduce the delay of the receiver processing it is possible to start the processing at multiple antenna elements in parallel and do the processing over several batches, as depicted in FIG. 14. The intermediate result from each batch processing step may then be combined by a simple addition operation. Since most of the per-antenna element processing can be performed without any input from other elements it is possible to perform almost all processing in parallel. It is also possible to do the batch processing in several steps, i.e. by processing batches of batches (not shown in FIG. 14).

Below an example embodiment of how configuration and channel estimation may be achieved in a system as per the present invention.

Figure 15:
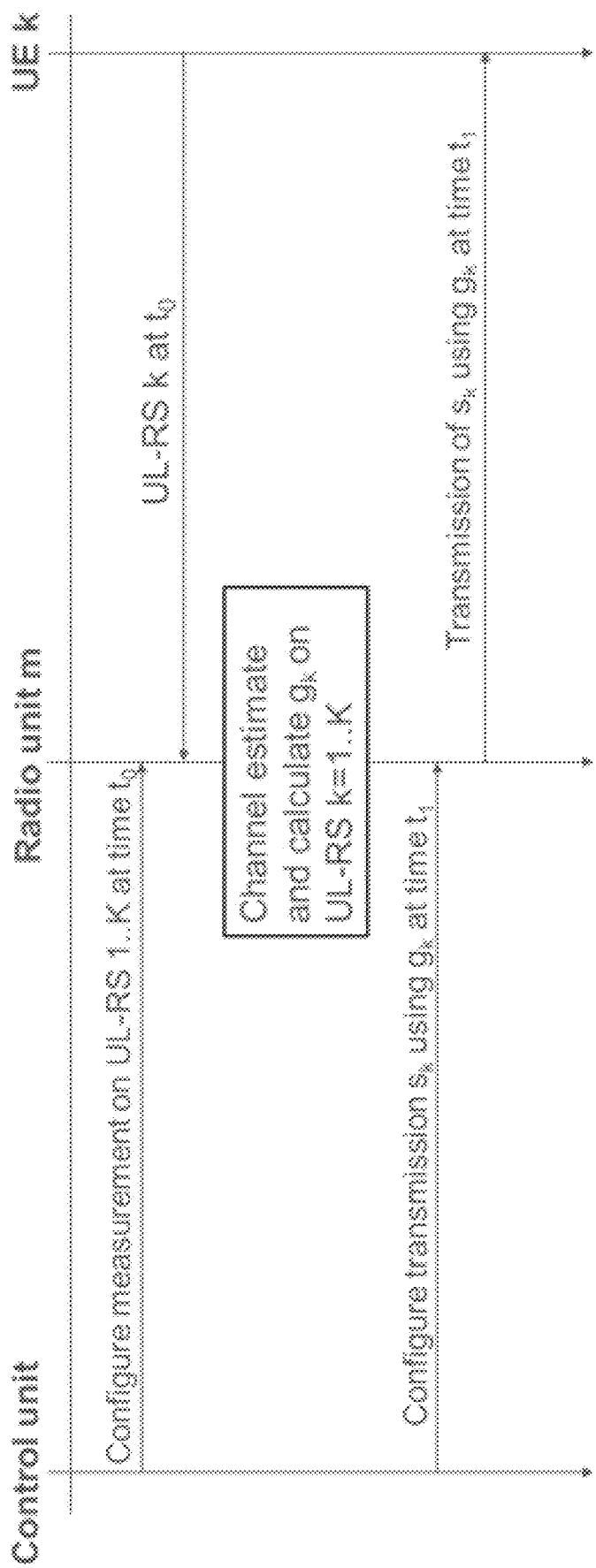
FIG. 15, shows an example of a configuration of reference signal for reciprocity based transmission according to an example embodiment of the present invention.
Figure 16:
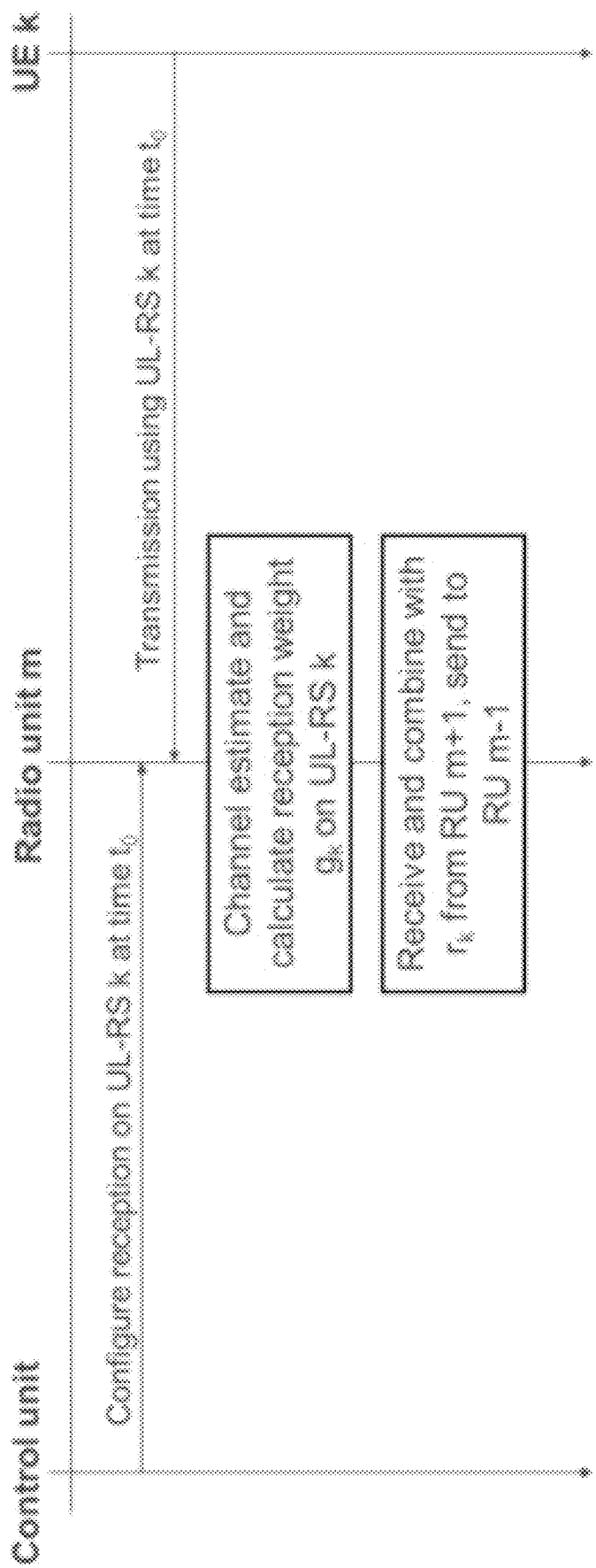
FIG. 16 shows an example of a configuration of reception of an UL transmission according to an example embodiment of the present invention.

In the practical implementation of the described invention, the radio units need to obtain knowledge about the UE for which the radio unit is supposed to do processing. Hence the radio unit needs to be aware about the timing of reference signal transmissions and the timing when data is supposed to be transmitted. The clock interface as depicted in FIG. 11 and FIG. 12 is important to achieve coherent reciprocity as this enables the units to synchronize to a common clock. In the configuration steps we can schematically see the order among the events needed for transmission in FIG. 15, showing an example of a configuration of reference signal for reciprocity based transmission, and reception in FIG. 16 showing an example of a configuration of reception of an UL transmission. The schematics should be viewed as an example, for example, the channel estimation could be performed after the reception of the configuration of the transmission of sk in FIG. 15. Observe that the signaling from the control unit to a radio unit is typically relayed through a set of other radio units, in the same principal as when the transmit signal is relayed by forwarding the configuration data packet.

It should be noted that since FIGS. 15 and 16 show a time line or time diagram, they may be regarded as flowcharts for illustrating a method.

Below an example embodiment of how weighted conjugate beamforming may be achieved according to an invention disclosed herein. It should be noted that even though the manner is taught with refrence4 to be used in a distributed massive MIMO system 600 as disclosed herein it may be used with antenna arrangements 300 as disclosed herein, but also with traditional antenna arrangements.

As mentioned in the background section, channel hardening property is less pronounced in D-maMIMO because of its network topology, resulting in worse system capacity. Therefore, within this invention, we also propose a proper precoding technique to boost the channel hardening at the user side in such a scenario, named as weighted conjugate beamforming (WCB). Compared to the conventional precoding scheme adopted for D-maMIMO, that is conjugate beamforming scheme (CB), also known as maximum ratio transmission (MRT), WCB precoding technique performs a weighted phase-shift of the transmitted signal. Analytically speaking, let M, K be the number of APs and UEs respectively, $q_k$ be the data symbol intended for the k-th UE, and $q_{mk}$ be the channel coefficient between the m-th AP and the k-th UE, then the transmitted data signal from the m-th AP to all the UEs can be written as $$x_m^{WCB} = \sum_{k=1}^{K} \frac{g_{mk}^*}{|g_{mk}|^\alpha} q_k.$$

where the superscript ( )* stands for conjugate, $\alpha$ is defined as beamforming weight, and $\alpha \geq 0$. The ratio $(g\_mk^*)/|g\_mk|^\alpha$ represents the so called precoding factor, for the WCB scheme. By contrast, for CB the precoding factor is $g\_mk^*$. Therefore, CB is a special case of WCB, i.e., when $\alpha=0$.

By increasing $\alpha$ value, the farther an AP from a given user is, the more power it transmits to that given user. Therefore, the number of APs effectively involved in coherently serving a given user increases, resulting in higher degree of channel hardening. On the other hand, from the AP perspective, increasing the number of UE to be served leads to sparser power allocation and, as a consequence, lower per-user SINR, since the overall transmit power is shared among more active users. This represents a trade-off and the optimal value of the beamforming weight $\alpha$, that maximizes system performance in terms of per-user achievable downlink rate, can be computed by solving the following optimization problem, $$\max_\alpha R_k = \log_2[1 + SINR_k(\alpha)]$$

$$\text{s.t. } \alpha \geq 0,$$

where R_k is the achievable DL rate of the k-th UE, and SINR_k is the effective SINR at the k-th UE, which depends also from $\alpha$.

Next, we introduce a simple example to show the benefits provided by our solution with respect the state-of-the-art. Let us consider a D-maMIMO system where a BS equipped by M APs simultaneously serves K single-antenna UEs (M>K), in the same frequency band, by operating in TDD mode. Simulations aim to compare the performance, in terms of per-user achievable DL rate, obtained by using our solution and the existing solution of the state-of-the-art. The main simulation parameters are listed in Table 1.

| PARAMETER | VALUE |
| --- | --- |
| M | 100 |
| K | 20 |
| Simulation area | 1 km² |
| Coherence Interval | 200 symbols |
| Carrier Frequency | 2 GHz |
| Bandwidth | 20 MHz |
| Small-scale fading model | Block Rayleigh fading with i.i.d realizations |
| Large-scale fading model | three-slope pathloss model + uncorrelated shadow fading with standard deviation 8 dB |
| Antenna height | 5 m UE antenna height 1.65 m |
| Radiated power | 200 mW DL, 100 mW UL |

Figure 17:
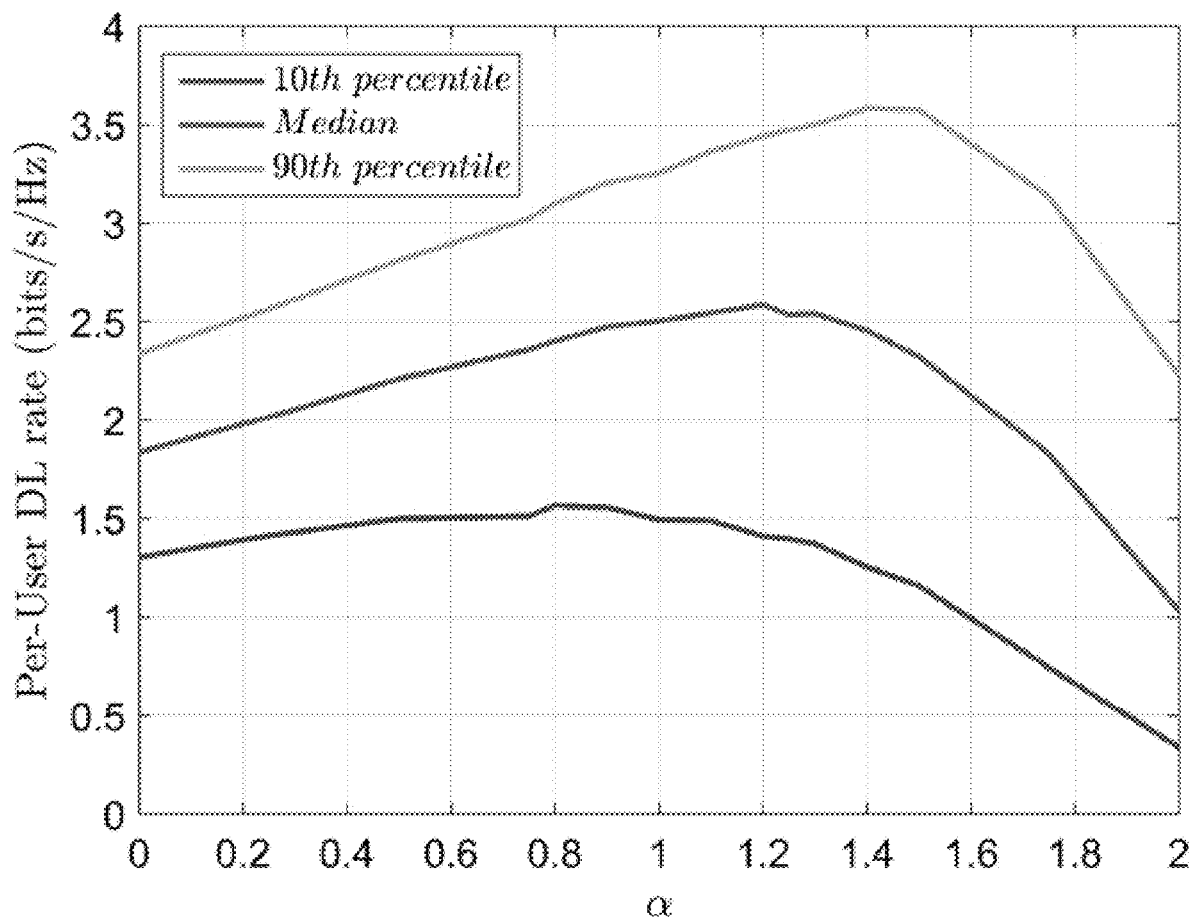
FIG. 17 shows the 10th percentile, median and 90th percentile of the per-user achievable downlink rates, for different values of a according to an example embodiment of the present invention.

FIG. 17 shows the 10th percentile, median and 90th percentile of the per-user achievable downlink rates, for different values of a, where it can be seen that When α=0, WCB corresponds to CB. The rates provided by the reference scheme (CB), corresponding to α=0, are equal to 1.3, 1.83, 2.34 bits/s/Hz respectively. As we can see, this rates can be further improved by adopting the proposed scheme (WCB), i.e., taking α>0. Moreover, the concave shape of the curve highlights the trade-off mentioned earlier: the more APs are involved in a coherent transmission, the better the channel hardening is, but the worse the per-user SINR is. By adopting WCB with α=0.8, the maximum 10th percentile per-user DL rate can be achieved by the system, i.e., 1.57 bits/s/Hz, corresponding to an improvement of about 21% over the CB scheme. Similarly, by adopting WCB with α=1.2, the maximum median per-user DL rate achieved by the system is 2.58 bits/s/Hz, corresponding to an improvement of about 41% over the CB scheme. In terms of 90th percentile rate, the gain over the reference scheme is about 53%, by choosing α=1.4.

Finally, we proved that WCB can outperform the CB scheme by properly choose the beamforming weight α. The WCB preceding scheme hardens the effective channel gains at the users, and, as a consequence, reduces the so-called user beamforming uncertainty gain, which comes from the user' lack of the short-term CSI knowledge. Therefore, the users can reliably decode the downlink data using only long-term statistical CSI. This potentially makes downlink training unnecessary, resulting in better system sum-capacity, resource allocation and system scalability.

Figure 18:
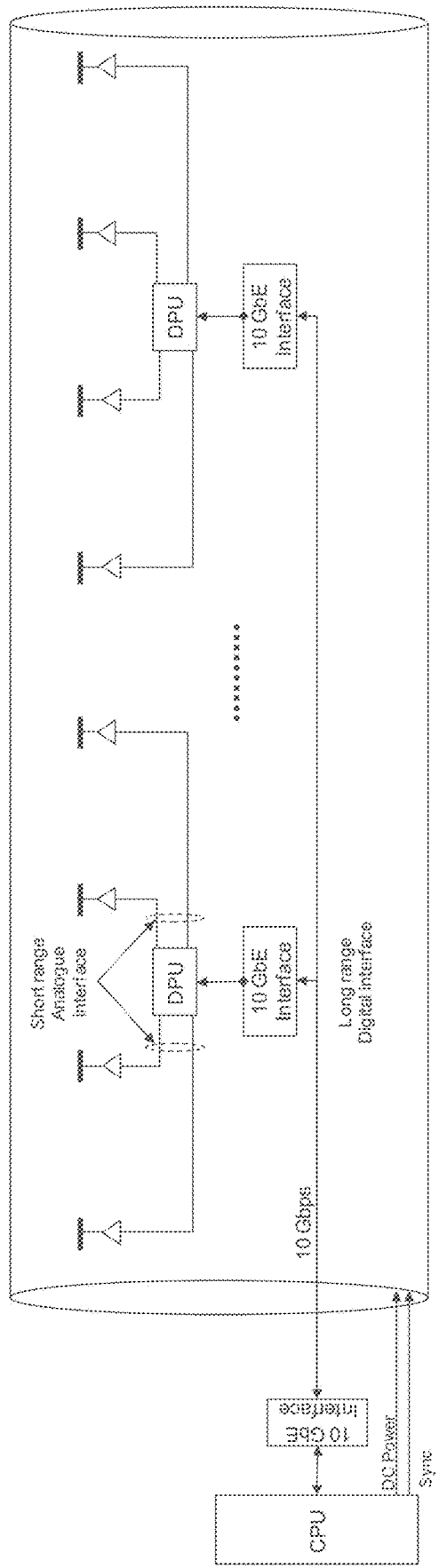
FIG. 18 shows an example embodiment of the present invention indicating that the communication inside the antenna arrangement may consist of both analogue (e.g. short range) and digital (e.g. long range) communication.

FIG. 18 shows an example where a long range interface is used to connect one or more antenna arrangements to a base station. Using a combination of long range interfaces and short range interfaces has the benefit of enabling for a larger data speed over larger distances using cheaper material. One example, is to use fiber optics or 10 GB Ethernet for the long range interface and electrical and analogue components for the short range interface.

FIG. 18 also shows how antenna arrangements can be divided into sub arrangements each having a distributed processing central (DPU) for performing some of the computations for the sub arrangement, such as collating partial processing results from or to the antenna devices.

Figure 19:
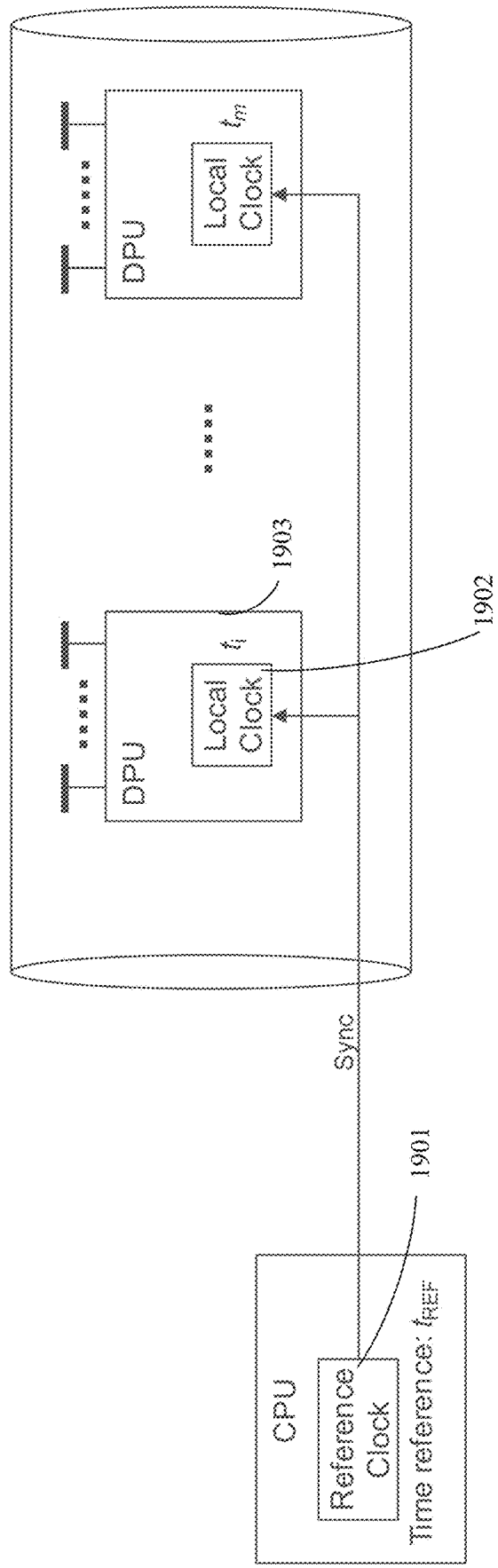
FIG. 19 shows an example embodiment of the present invention indicating that a distributed time synchronization arrangement can be used to enable the required time and frequency accuracy required for distributed coherent beam-forming.

FIG. 19 shows an example embodiment of the present invention wherein a series of antenna sub arrangements are shown having distributed processing units 1903.

In order to maintain an exact synchronization, each sub antenna arrangement may comprise a local clock oscillator 1902 as transmitting many different signals with perfect phase alignment requires very accurate time synchronization.

This can be achieved by the distributed local clock circuits (oscillators) along the length of the antenna arrangement, each local clock being synchronized to a central clock reference.

When deriving a time reference for distributed processing in a distributed processing unit the time delay (phase shift) between the elements (caused by signal propagation delay in the cable) may be calibrated and compensated for.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

What is claimed is:

1. An antenna arrangement for distributed processing, the antenna arrangement comprising:
   a plurality of antenna devices arranged in a chain;
   wherein each antenna device comprises an antenna element and processing circuitry configured for performing per-antenna-element processing with respect to the corresponding antenna element; and
   wherein the processing circuitry in each antenna device is configured to:
      locally perform a channel estimate based on a pilot signal received at the antenna device from a wireless communication terminal;
      receive a data signal from a previous antenna device in the chain of antenna devices; and
      process the data signal by using the channel estimate to form a transmission signal.

2. The antenna arrangement of claim 1, wherein the processing circuitry in each of one or more of the antenna devices in the chain is further configured to:
   transmit the transmission signal to the wireless communication terminal via the corresponding antenna element; and
   forward the data signal to a next antenna device in the chain of antenna devices.

3. The antenna arrangement of claim 1, wherein the processing circuitry is further configured to process the data signal using the channel estimate by multiplying the data signal with a complex conjugate of the channel estimate.

4. An antenna arrangement for distributed processing, the antenna arrangement comprising:
   a plurality of antenna devices arranged in a chain;
   wherein each antenna device comprises an antenna element and processing circuitry configured for performing per-antenna-element processing with respect to the corresponding antenna element; and
   wherein the processing circuitry in each antenna device is configured to:
      locally perform a channel estimate based on a pilot signal received at the antenna device from a wireless communication terminal;
      receive a processed signal from a next antenna device in the chain of antenna devices;
      using the channel estimate, process an antenna signal received from the wireless communication terminal via the corresponding antenna element;
      add the processed antenna signal to the received processed signal to form a combined signal; and
      forward the combined signal to a previous antenna device for further forwarding along the chain of antenna devices.

5. A distributed massive Multiple-Input Multiple-Output (MIMO) system comprising the antenna arrangement of claim 1.

6. An antenna device adapted for use in an antenna arrangement of a distributed massive Multiple Input Multiple Output (MIMO) system, wherein the distributed massive MIMO system comprises a central unit and wherein the antenna arrangement comprises a chain of antenna devices, including the antenna device, the antenna device comprising:
 an antenna element and processing circuitry configured for performing per-antenna-element processing with respect to the corresponding antenna element;
 wherein the processing circuitry in each antenna device is configured to:
  locally perform a channel estimate based on a pilot signal received at the antenna device from a wireless communication terminal;
  receive a data signal from a previous antenna device in the chain of antenna devices; and
  process the data signal by using the channel estimate to form a transmission signal.

7. The antenna device of claim 6, wherein the processing circuitry is further configured to:
 transmit the transmission signal to the wireless communication terminal via the antenna element; and
 forward the data signal to a next antenna device in the chain of antenna devices.

8. The antenna device of claim 6, wherein the processing circuitry is further configured to process the data signal using the channel estimate by multiplying the data signal with a complex conjugate of the channel estimate.

9. An antenna device adapted for use in an antenna arrangement of a distributed massive Multiple Input Multiple Output (MIMO) system, wherein the distributed massive MIMO system comprises a central unit and wherein the antenna arrangement comprises a chain of antenna devices, including the antenna device, the antenna device comprising:
 an antenna element and processing circuitry configured for performing per-antenna-element processing with respect to the corresponding antenna element;
 wherein the processing circuitry in each antenna device is configured to:
  locally perform a channel estimate based on a pilot signal received at the antenna device from a wireless communication terminal;
  receive a processed signal from a next antenna device in the chain of antenna devices;
  using the channel estimate, process an antenna signal received from the wireless communication terminal via the antenna element;
  add the processed antenna signal to the received processed signal to form a combined signal; and
  forward the combined signal to a previous antenna device for further forwarding along the chain of antenna devices to the central unit.

10. A method implemented by an antenna device adapted for use in an antenna arrangement of a distributed massive Multiple Input Multiple Output (MIMO) system, wherein the distributed massive MIMO system comprises a central unit and wherein the antenna arrangement comprises a chain of antenna devices, including the antenna device, the method comprising:
 performing per-antenna-element processing with respect to a corresponding antenna element in the antenna device;
 wherein the per-antenna-element processing comprises:
  locally performing a channel estimate based on a pilot signal received at the antenna device from a wireless communication terminal;
  receiving a data signal from a previous antenna device in the chain of antenna devices; and
  processing the data signal, by using the channel estimate, to form a transmission signal.

11. The method of claim 10, further comprising:
 transmitting the transmission signal to the wireless communication terminal via the antenna element; and
 forwarding the data signal to a next antenna device in the chain of antenna devices.

12. The method of claim 10, wherein processing the data signal comprises multiplying the data signal with a complex conjugate of the channel estimate.

13. A method implemented by an antenna device adapted for use in an antenna arrangement of a distributed massive Multiple Input Multiple Output (MIMO) system, wherein the distributed massive MIMO system comprises a central unit and wherein the antenna arrangement comprises a chain of antenna devices, including the antenna device, the method comprising:
 performing per-antenna-element processing with respect to a corresponding antenna element in the antenna device;
 wherein the per-antenna-element processing comprises:
  locally performing a channel estimate based on a pilot signal received at the antenna device from a wireless communication terminal;
  receiving a processed signal from a next antenna device in the chain of antenna devices;
  using the channel estimate, processing an antenna signal received from wireless terminal via the antenna element;
  adding the processed antenna signal to the received processed signal to form a combined signal; and
  forwarding the combined signal to a previous antenna device for further forwarding along the chain of antenna devices to the central unit.

14. The distributed massive Multiple-Input Multiple-Output (MIMO) system of claim 5, further comprising a central network node connected to the antenna arrangement and configured to act as a base station.

15. A distributed massive Multiple-Input Multiple-Output (MIMO) system comprising the antenna arrangement of claim 4.

16. The distributed massive Multiple-Input Multiple-Output (MIMO) system of claim 15, further comprising a central network node connected to the antenna arrangement and configured to act as a base station.

* * * * *

UNITED STATES PATENT AND TRADEMARK OFFICE
CERTIFICATE OF CORRECTION

| | | |
|---|---|---|
| PATENT NO. | : 11,916,625 B2 | Page 1 of 1 |
| APPLICATION NO. | : 17/736550 | |
| DATED | : February 27, 2024 | |
| INVENTOR(S) | : Frenger et al. | |

It is certified that error appears in the above-identified patent and that said Letters Patent is hereby corrected as shown below:

In the Specification

In Column 6, Line 34, delete "a according" and insert -- $\alpha$ according --, therefor.

In Column 8, Line 42, delete "devices 315b and 31cb." and insert -- devices 315b and 315c. --, therefor.

In Column 13, Lines 66-67, delete "conjugate beamforming scheme (CB)," and insert -- conjugate beamforming (CB) scheme, --, therefor.

In Column 14, Line 5, delete "q_mk" and insert -- g_mk --, therefor.

In Column 14, Line 14, delete "a" and insert -- $\alpha$ --, therefor.

In Column 15, Line 22, delete "preceding" and insert -- precoding --, therefor.

In Column 15, Lines 39-40, delete "distributed processing central (DPU)" and insert -- distributed processing unit (DPU) --, therefor.

In Column 15, Lines 53-54, delete "central clock reference." and insert -- central clock reference 1901. --, therefor.

Signed and Sealed this
Sixteenth Day of July, 2024

Katherine Kelly Vidal
*Director of the United States Patent and Trademark Office*